United States Patent [19]

Savall et al.

[11] Patent Number: 5,198,108
[45] Date of Patent: Mar. 30, 1993

[54] ASSEMBLY FOR REMOVING WATER FOR WASHING FILTERS

[75] Inventors: Vincent Savall, Velizy Villacoublay; Marie-Pierre Gaudin, Saint-Germain En Laye, both of France

[73] Assignee: Degremont, Rueil-Malmaison, France

[21] Appl. No.: 716,117

[22] Filed: Jun. 17, 1991

[30] Foreign Application Priority Data

Jun. 20, 1990 [FR] France .................. 90 07718

[51] Int. Cl.⁵ ........................... B01D 24/46
[52] U.S. Cl. .................. 210/265; 210/274; 210/279; 210/288; 210/521
[58] Field of Search .......... 210/265, 274, 279, 288, 210/521

[56] References Cited

U.S. PATENT DOCUMENTS

| | | | |
|---|---|---|---|
| 2,453,345 | 11/1948 | Row. | |
| 3,433,359 | 3/1969 | Lundin et al. | 210/265 |
| 3,459,302 | 8/1969 | Ross | 210/274 |
| 4,076,625 | 2/1978 | Scholten et al. | 210/274 |
| 4,202,774 | 5/1980 | Kos | 210/279 |
| 5,013,435 | 5/1991 | Rider et al. | 210/265 |

FOREIGN PATENT DOCUMENTS 634966 8/1936 Fed. Rep. of Germany .
1033183 6/1952 Fed. Rep. of Germany .
2059261 8/1972 Fed. Rep. of Germany .

Primary Examiner—Robert A. Dawson
Assistant Examiner—W. L. Millard
Attorney, Agent, or Firm—Pollock, VandeSande & Priddy

[57] ABSTRACT

An assembly for removing wash water for washing filters containing granular filter material, which are washed simultaneously with water and air, such as those employed especially in water treatment, and recovering the particles of granular filter material entrained by the water during the washing which includes a collecting member having calibrated holes for collecting and removing dirty water, internal and external partitions placed on each side of the collecting member, defining a water recovering zone inside the internal partitions and between the internal and external partitions, tranquil flow zones promoting the separation, by downward concurrent settling of the particles of granular material and of the dirty water to be removed, and a baffle intended to avoid disturbing the preceding zones by the water/air/granular material three-phase mixture formed during the washing, placed under said zones and directing the three phase mixture towards an external degassing zone where the air is removed before the resulting two-phase mixture enters the tranquil settling zones.

10 Claims, 2 Drawing Sheets

ASSEMBLY FOR REMOVING WATER FOR WASHING FILTERS

The present invention relates to an assembly intended for removing backwash water for washing filters containing granular filter material and the recovery of the particles of granular material entrained with the water during the backwash step.

BACKGROUND OF THE INVENTION

Washing of filters containing granular filter material, which becomes necessary after a certain, variably long period of operation of the filter is conventionally carried out by reverse flow of washing fluids. A number of methods of washing are known, namely reversing the flow of water by itself or stirring the filter mass with air by itself and flushing with water without air, or combined washing with air and water which are injected simultaneously into the mass. This latter type of washing is particularly advantageous because it uses greater stirring energies and requires shorter washing periods. It has been employed for a long time for washing sand filters. Today its efficiency no longer needs to be demonstrated. However, until now, combined washing with air and water (or hydropneumatic washing) could not easily be applied to the washing of filters containing lightweight materials or multilayer filters. In fact, lightweight materials, such as anthracite, have a low density of the order of 1500 kg/m³. A phenomenon of flotation of the particles of filter material is then produced during the stage of unblocking with air and water; when the level of the air/water emulsion reaches the spillway of the wash-water collection gutter, a large proportion of the filter mass is then entrained in the gutter.

To avoid this, a known technique consists in raising considerably the level of the spillway of the wash-water collection member so that the entrained material has time to settle before spilling into the gutter. This solution has the immediate disadvantages of considerably increasing the height of the structures as well as the time and water volumes which are necessary.

Various solutions have already been proposed to the very general problem of the backwash water collection member and removal of water which has been used for washing granular filter material on filters of the kind in question, whatever their type, in particular when the filter mass consists of material of low density, without the collection and the removal of this water being accompanied by an untimely entrainment of the material.

One of these solutions (U.S. Pat. No. 4,479,880) consists in equipping the wash-water collection gutters with systems which divert the rising air and water streams. The streams which are thus diverted arrive opposite plates comprising a perforated horizontal part and an inclined part.

Above the perforated plates, the entrained material separates from the air bubbles to which it is attached and settles towards the filter bed in the region bounded by the inclined part of the plate.

This solution has many disadvantages, the chief of which are the following:

The air diverted in the first step rises along the inclined plates and passes through the perforated plate, causing damming of the flow towards the spillway of the gutter and preventing the material from settling towards the filter bed. The so-called settling zone then becomes turbulent and the settling action of the material becomes impossible. On the contrary, the particles of material separated from the air are once again entrained in this turbulence towards the spillway.

Another known solution (U.S. Pat. No. 4,478,726) consists of a device consisting of a horizontal plate placed opposite the spillway of a wash-water collection gutter. In these conditions, the rising water and air are diverted by the plate in line with the spillway. The material detaches itself from the air bubbles at the end of the plate and then settles onto its horizontal part and returns inside the filter by means of a space provided in line with the spillway.

The greatest disadvantages of such a device are the following:

as in the preceding solution, the air which is removed at the end of the plate causes damming of the flow towards the spillway and, above all, a high turbulence in the region where settling of the particles of material should take place, tending to resuspend them;

in addition, the horizontal plate defines a settling zone which must be very large because the settling rates of the filter materials employed are low and the particles are entrained by the overspill flow. For settling to take place, the plate must be very large in size;

the air accumulated under the plate can no longer be removed. This quantity of air, which becomes increasingly larger in the course of the washing, prevents the recirculation of the particles of material towards the filter bed. An accumulation of material is then produced opposite the spillway and the material is then entrained into the spillway and from there to the gutter;

when the air and water washing is stopped a large quantity of material remains on the plate without any possible return towards the filter mass. This material can then be removed only by the additional fitting of complicated or costly flushing or sweeping devices.

Yet another solution (U.S. Pat. No. 4,076,625) consists of a device fitted to the wash-water collection gutters, in the form of symmetrical baffles serving as deflectors of the water and air flow.

While, by virtue of this device, no accumulation of granular material takes place, this device nevertheless presents a major disadvantage during the flushing stage. In fact, the flushing water intended to remove out of the filter the result of the unblocking with air and water is itself also diverted by the baffles. The flow can take place only between the baffles, to spill over into the water collection gutter. The quantity of flushing water accumulated during the unblocking between the devices fitted to each gutter represents a large volume of water which cannot be flushed or which at least will be flushed at the cost of a very long flushing period. In addition, the flow in the space provided between the baffles acting as deflectors is countercurrent to the fluid and the material. The sizing of these deflecting members results in bulky devices which require very great heights of water above the material.

Finally, such a system cannot be fitted to filters with a single lengthwise spillway.

A possible known recent solution (French Patent 85/05,986) relates to a device employing a plurality of vertical plates, or dishes, at uniform intervals, which are arranged in a quincunx pattern and are situated upstream of a settling zone.

The particles of material separated from the air bubbles as they pass between the dishes settle in a "tranquil" zone and return towards the filter bed by means of a calibrated space provided under the dishes.

The washing water then spills over into a collection gutter after the settling zone.

This solution is applicable to materials with a density of the order of 1,700 kg/m$^3$. However, in the case of materials with a density of the order of, or lower than, 1,500 kg/m$^3$ and whose settling rate is of the order of 50 m/h, the settling zone to be provided would have to be very large in size, thus adding a penalty to the cost of the structure.

SUMMARY OF THE INVENTION

The invention relates to an assembly which makes it possible to avoid these disadvantages.

The assembly in accordance with the invention is characterised in that it comprises:
a collection member for collecting and removing dirty water having a plurality of calibrated openings in a wall thereof;
internal and external partitions placed on either side of the collection member, defining inside the internal partitions a water recovery zone and, between the internal and external partitions, flow-tranquil zones promoting the separation, by downward concurrent settling, of the particles of granular material and of the dirty water to be removed;
a baffle intended to avoid disturbing the water recovery and flow tranquil zones by the water/air/granular material three-phase mixture formed during the washing, placed under these zones and directing the three-phase mixture towards an external degassing zone where the air is removed before the mixture, which has become two-phase, enters the tranquil settling zones.

BRIEF DESCRIPTION OF THE DRAWINGS

Embodiments of this device have been described below, by way of examples without any limitation being implied, with reference to the attached drawings, in which.

DETAILED DESCRIPTION OF THE INVENTION

Figure 1:
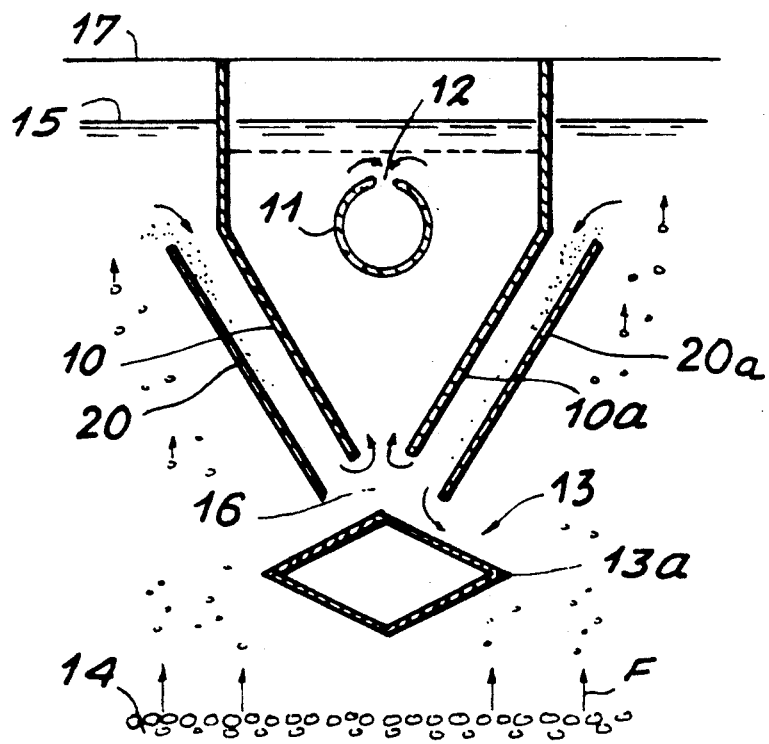
FIG. 1 is a partial sectional view of an embodiment of the invention.
Figure 2:
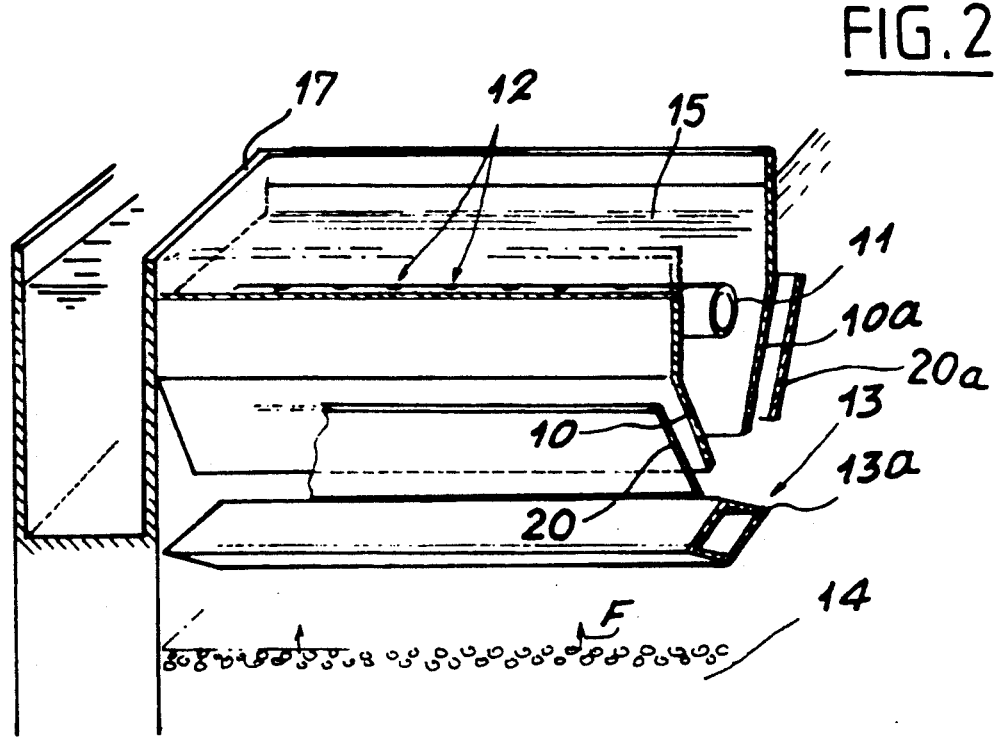
FIG. 2 is a partial view of this same embodiment, in perspective.

In accordance with the invention and in accordance with one of its characteristics, the wash-water collection member 11 consists of a pipe (FIGS. 1, 2 and 4) provided with calibrated holes such as 12, the reason for which will be seen later. Collection member 11 could equally well and in accordance with the invention consist of a gutter which is open in its upper part (FIG. 3), the calibrated orifices (12) being then provided in its lower part, the edges 18 of the gutter being at a higher level than the internal and external partitions.

The assembly in accordance with the invention comprises two separating internal partitions 10 and 10$a$, each consisting either of a vertical part and an oblique part in the first two embodiments proposed by way of examples (FIGS. 1, 2 and 3), or of a single vertical part in the third embodiment (FIG. 4), which are arranged symmetrically on either side of the vertical plane passing through the axis of collection member 11, the oblique parts forming between them a convergent angle in the first two embodiments, thus defining a still zone between them.

The assembly in accordance with the invention also comprises two flow-moderating external partitions 20 and 20$a$, outside the preceding ones, parallel to the oblique parts of the partitions 10 and 10$a$ in the first two embodiments, oblique and convergent in the third embodiment, the spaces thus formed between the partitions 10 and 20, on the one hand, 10$a$ and 20$a$ on the other hand, forming regions of tranquil flow promoting the downward concurrent separation of the granular material and of the dirty water. These zones may comprise partitions consisting of pipes, blades, honeycombs or any other similar device, not shown in the figures and intended to reduce further the hydraulic diameter and consequently the turbulence.

Below the outlet of these still zones, a baffle is arranged, consisting, for example, of a tube 13 of polygonal section, arranged so that its ridges 13$a$ divert the rising streams of the three-phase mixture towards the outside of the still zones.

The assembly operates as follows:

Whereas the filtration in the filter bed consisting of granular filter material 14 takes place from the top downwards, the washing of the material is carried out from the bottom upwards as shown by the arrows F.

The three-phase mixture consisting of the air and water washing fluids and of the particles of granular material separated from the filter mass during the washing encounters baffle 13 and, under these conditions, the air bubbles are diverted towards the surface 15 of the water in the filter apparatus, outside the partitions 20, 20$a$.

The particles of granular material, which these bubbles have entrained, then enter with the water which carries them, the downward concurrent separation zones arranged between the partitions 10/20 and 10$a$/20$a$, from which they emerge, settled, in an undisturbed zone 16. This promotes movement towards the filter bed of the particles of material separated from the water, the latter then flowing towards the collection member 11.

The use, in accordance with the invention, of a pipe with calibrated orifices as an collection member for the water which has been used for the washing offers particularly beneficial technical effects.

In fact, after washing with air and water, the stage of flushing the layers of dirty waters accumulated above the filter bed is thus facilitated.

When the flushing with water alone is carried out, the flow of injected water increases, the pressure drop in the holes then increases and the water level 15 rises in the filter. In the first and third embodiments (FIGS. 1, 2 and 4) it reaches a general spillway 17 arranged on one side of the structure, preferably perpendicularly to the pipes. Most of the water is then removed freely and directly all along the spillway, only partially passing through the separation zones, that is to say without any increase in the washing times or in the flow rates which characterise the processes and devices employed hitherto.

In the second embodiment (FIG. 3) the water level 15 reaches the upper edges 18 of the gutter, which thus serves as a spillway. During the flushing stage, therefore, a spillway length equal to twice the length of the gutters is obtained, and this further reduces the flushing time and the distortions of hydraulic flow.

Figure 3:
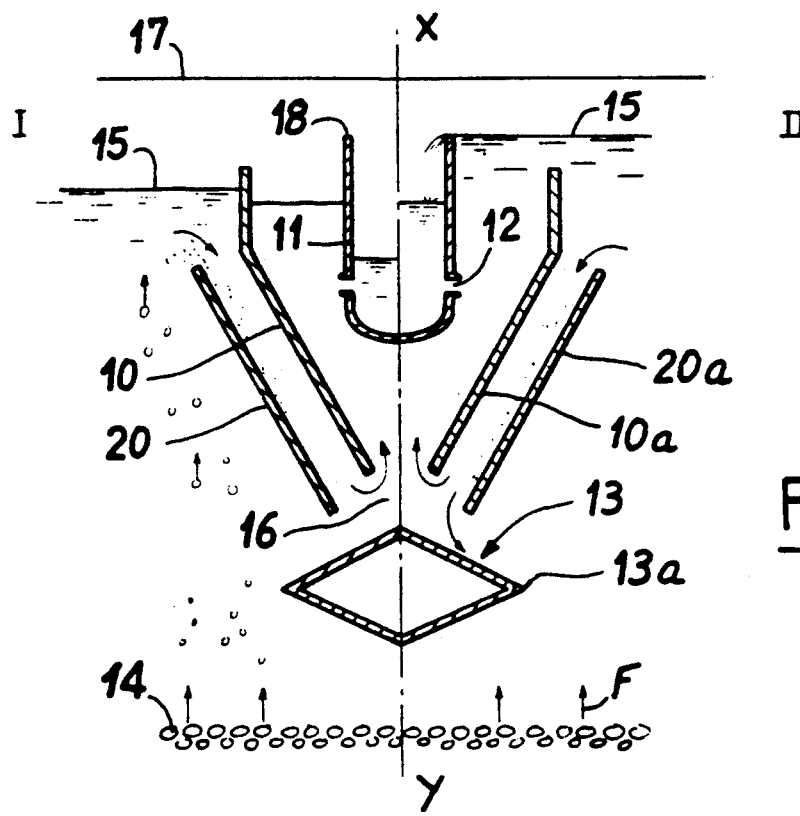
FIG. 3 is a partial sectional view of a second embodiment.
Figure 4:
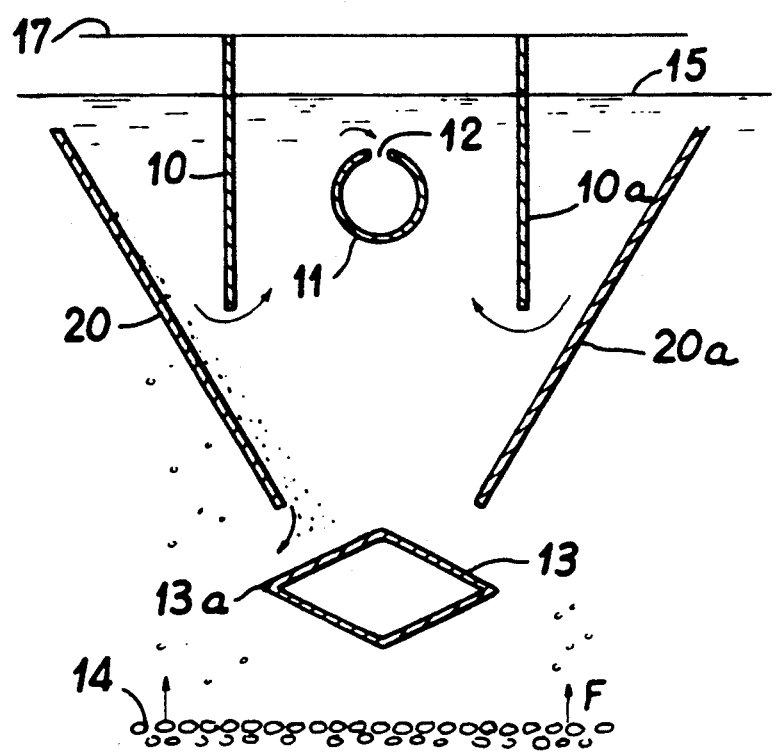
FIG. 4 is a partial sectional view of a third embodiment of the invention.

To make this method of operation clearer, a plan in section through the axis X, Y of FIG. 3 has been plotted and shows, on the left (I), the water levels during the washing period and, on the right (II), these levels during the flushing period.

In general, the invention offers remarkable advantages when compared with the known arrangements.

The result of the use of separating zones is that the whole device is comparable in size to the conventional gutters for taking off water from filters containing granular materials, for example 200×400 mm. The bulk is therefore reduced, the device does no require any increase in the height of the structures, or in the period or rate of flow of the washing water. This means that it can be adapted perfectly and easily to existing structures; for example, to filters containing lightweight material which could not be washed simultaneously with air and water.

Parameters such as the angle of inclination of the partitions to the median vertical plane and their spacing can be adjusted so that they can be applied to any three-phase system, depending on the space and the possibilities which are available.

What follows is an example of the embodiment of the invention, applied in the case of a filter with an area of 4 $m^2$ in which the granular filter material has a density of the order of 1500 kg/$m^3$ and a settling rate of 70 m/h. This filter is washed with air and water at flow rates of 60 $m^3/h/m^2$ of filter and 5 $m^3/h/m^2$ of filter respectively and is then flushed with water alone at the rate of 20 $m^3/h/m^2$ of filter. Each settler consists of inclined plates 200 mm in length at an angle of 45° to the vertical and 5 cm apart. The pipe for collecting the washing and the flushing water has a diameter of 60 mm, pierced with holes 20 mm in diameter at uniform intervals of 100 mm.

We claim:

1. An assembly for removing backwash water used for washing filters containing granular filter material, which are backwashed simultaneously with water and air, and recovering particles of granular filter material entrained by the backwash water during the washing which comprises:
    a collection member for collecting and removing dirty backwash water, said collection member being provided with a plurality of calibrated openings in a wall thereof;
    an internal and an external partition placed on each side of said collection member, defining a water recovery zone inside the internal partitions, and, between said internal and external partitions, flow-tranquil zones for promoting the separation, by downward concurrent settling, of the particles of granular material and of the dirty backwash water to be removed; and,
    a baffle adapted to avoid disturbing said water recovery zone and said quiescent zone by a water/air/-granular material three-phase mixture formed during a backwash step, said baffle being positioned under said zones and directing said three-phase mixture towards an external degassing zone for removing air before the mixture, which has become two-phase, enters the tranquil settling zones.

2. An assembly according to claim 1, wherein the member for collecting the backwash water comprises a pipe provided with calibrated orifices.

3. An assembly according to claim 1, wherein the member for collecting and removing the backwash water comprises an open gutter whose upper edges are at a higher level than said internal and external partitions.

4. An assembly according to claim 2, wherein the calibration of the orifices of the collection pipe is chosen so that, during a process of flushing with water alone at a high rate, wherein the pressure drop determined by these calibrated orifices is reflected in a rise in the level of the water present in the filter, the dirty water is removed directly via a spillway.

5. An assembly according to claim 3, wherein the calibration of the orifices of the collection gutter is chosen so that, during the operation of flushing with water alone at a high rate, by virtue of the pressure drop determined by these calibrated orifices being reflected in a rise in the level of the water present in the filter, the dirty water is removed directly via the upper edges of the gutter, acting as spillways.

6. An assembly according to claim 1, wherein the separation zone is defined by a member which comprises two internal walls placed symmetrically on either side of a vertical median plane passing through the axis of the collection member, defining between them an undisturbed zone promoting the return of the granular material towards the filter medium while the water is removed via the member, and at least one tranquilizing external wall forming, with the internal walls, downward concurrent separation zones.

7. An assembly according to claim 6, wherein the spaces existing between the internal and external walls are partitioned by pipes, blades or partitions in the form of a honeycomb for reducing the hydraulic diameter and consequently the turbulence.

8. An assembly according to claim 6, wherein said external walls are plates parallel to the oblique part of the internal walls.

9. An assembly according to claim 1, wherein said baffle is placed in the path of the three-phase mixture, and facing the downward concurrent separation zones, for diverting the air bubbles away from said separation zones to escape towards the surface of the filter.

10. An assembly according to claim 9, wherein said baffle consists of a tube of polygonal section having ridges at intersections of its sides and oriented so that said ridges cause the diversion of the air bubbles.

* * * * *